United States Patent
Kim et al.

(10) Patent No.: US 12,525,648 B2
(45) Date of Patent: Jan. 13, 2026

(54) ADDITIVE, ELECTROLYTE COMPRISING SAME FOR RECHARGEABLE LITHIUM BATTERY, AND RECHARGEABLE LITHIUM BATTERY

(71) Applicant: SAMSUNG SDI CO., LTD., Yongin-si (KR)

(72) Inventors: Sanghyung Kim, Yongin-si (KR); Tae Jin Lee, Yongin-si (KR); Minseo Kim, Yongin-si (KR); Myungheui Woo, Yongin-si (KR); Hyejin Park, Yongin-si (KR); Sanghoon Kim, Yongin-si (KR); Dahyun Kim, Yongin-si (KR); Bokyung Ryu, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 490 days.

(21) Appl. No.: 18/002,853

(22) PCT Filed: Apr. 6, 2022

(86) PCT No.: PCT/KR2022/004925
§ 371 (c)(1),
(2) Date: Dec. 21, 2022

(87) PCT Pub. No.: WO2022/220474
PCT Pub. Date: Oct. 20, 2022

(65) Prior Publication Data
US 2024/0047746 A1    Feb. 8, 2024

(30) Foreign Application Priority Data
Apr. 12, 2021   (KR) .................. 10-2021-0047369

(51) Int. Cl.
*H01M 10/0567* (2010.01)
*H01M 4/02* (2006.01)
(Continued)

(52) U.S. Cl.
CPC ....... *H01M 10/0567* (2013.01); *H01M 4/133* (2013.01); *H01M 4/134* (2013.01);
(Continued)

(58) Field of Classification Search
CPC ............................................. H01M 10/0567
See application file for complete search history.

(56) References Cited

U.S. PATENT DOCUMENTS

| 2015/0236379 A1 | 8/2015 | Wietelmann et al. |
| 2018/0034103 A1 | 2/2018 | Kubo et al. |

(Continued)

FOREIGN PATENT DOCUMENTS

| CN | 102786443 A | 11/2012 |
| CN | 102816096 A | 12/2012 |

(Continued)

OTHER PUBLICATIONS

International Search Report of PCT/KR2022/004925, Jul. 8, 2022, 4 pp.
(Continued)

*Primary Examiner* — Barbara L Gilliam
*Assistant Examiner* — Jade Serena Simmons
(74) *Attorney, Agent, or Firm* — Womble Bond Dickinson (US) LLP

(57) ABSTRACT

Provided are an additive represented by Chemical Formula 1, an electrolyte for a rechargeable lithium battery including the same, and a rechargeable lithium battery.
The details of Chemical Formula 1 are as set forth in the specification.

12 Claims, 6 Drawing Sheets

(51) Int. Cl.
    *H01M 4/133*      (2010.01)
    *H01M 4/134*      (2010.01)
    *H01M 4/38*      (2006.01)
    *H01M 4/587*      (2010.01)
    *H01M 10/0525*      (2010.01)

(52) U.S. Cl.
    CPC ........... *H01M 4/386* (2013.01); *H01M 4/587* (2013.01); *H01M 10/0525* (2013.01); *H01M 2004/021* (2013.01); *H01M 2004/027* (2013.01)

(56) References Cited

U.S. PATENT DOCUMENTS

| | | |
|---|---|---|
| 2018/0076484 A1 | 3/2018 | Nakatsutsumi et al. |
| 2019/0198924 A1 | 6/2019 | Kim et al. |
| 2019/0207258 A1 | 7/2019 | Kim et al. |
| 2021/0020991 A1 | 1/2021 | Nakazawa |

FOREIGN PATENT DOCUMENTS

| | | |
|---|---|---|
| JP | 2017-010924 A | 1/2017 |
| JP | 6715096 B2 | 7/2020 |
| KR | 10-2018-0028000 A | 3/2018 |
| KR | 10-2019-0079695 A | 7/2019 |
| WO | WO 2017-015996 A1 | 2/2017 |
| WO | WO 2019-189670 A1 | 10/2019 |
| WO | WO 2022/093716 A1 | 5/2022 |

OTHER PUBLICATIONS

Ahmed, et al., "Novel divalent organo-lithium salts with high electrochemical and thermal stability for aqueous rechargeable Li-Ion batteries", Electrochimica Acta, vol. 298, 2019, pp. 709-716.

Extended European Search Report, Application No. 22788330.3, issued on Nov. 19, 2024, 8 pps.

Chinese Office Action for CN Application No. 202280007491.5, dated Sep. 19, 2025, 7 pages.

ADDITIVE, ELECTROLYTE COMPRISING SAME FOR RECHARGEABLE LITHIUM BATTERY, AND RECHARGEABLE LITHIUM BATTERY

CROSS-REFERENCE TO RELATED APPLICATIONS

This application is a U.S. National Phase Patent Application of International Application Number PCT/KR2022/004925, filed on Apr. 6, 2022, which claims priority of Korean Patent Application Number 10-2021-0047369, filed on Apr. 12, 2021, the entire content of each of which is incorporated herein by reference.

TECHNICAL FIELD

This disclosure relates to an additive, an electrolyte including the same for a rechargeable lithium battery, and a rechargeable lithium battery.

BACKGROUND ART

A rechargeable lithium battery may be recharged and has three or more times as high energy density per unit weight as a conventional lead storage battery, nickel-cadmium battery, nickel hydrogen battery, nickel zinc battery and the like. It may be also charged at a high rate and thus, is commercially manufactured for a laptop, a cell phone, an electric tool, an electric bike, and the like, and researches on improvement of additional energy density have been actively made.

Such a rechargeable lithium battery is manufactured by injecting an electrolyte into a battery cell, which includes a positive electrode including a positive electrode active material capable of intercalating/deintercalating lithium ions and a negative electrode including a negative electrode active material capable of intercalating/deintercalating lithium ions.

Particularly, the electrolyte uses an organic solvent in which a lithium salt is dissolved, and such an electrolyte is important in determining stability and performance of a rechargeable lithium battery.

$LiPF_6$, which is most commonly used as a lithium salt of the electrolyte, has a problem of accelerating the depletion of the solvent and generating a large amount of gas by reacting with the organic solvent of the electrolyte. When $LiPF_6$ decomposes, $LiF$ and $PF_5$ are produced, which causes electrolyte depletion in the battery, resulting in high-temperature performance degradation and poor safety.

In particular, at low temperatures, a voltage drop during discharge may be large due to the increase in internal resistance of the battery, and thus it is difficult to obtain a sufficient discharge voltage.

DISCLOSURE

Technical Problem

An embodiment provides an additive having excellent output characteristics even under low-temperature conditions by suppressing an increase in internal resistance of a battery at low temperature.

Another embodiment provides an electrolyte for the rechargeable lithium battery with improved lifespan characteristics by applying the additive.

Another embodiment provides a rechargeable lithium battery including the electrolyte for the rechargeable lithium battery.

Technical Solution

An embodiment of the present invention provides additive represented by Chemical Formula 1.

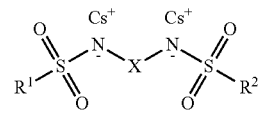

[Chemical Formula 1]

In Chemical Formula 1,

X is $C(=O)$ or $S(=O)_2$, and $R^1$ and $R^2$ are each independently a fluoro group, or a C1 to C5 fluoroalkyl group substituted with at least one fluoro group.

For example, Chemical Formula 1 may be represented by one of Chemical Formula 1-1 or Chemical Formula 1-8.

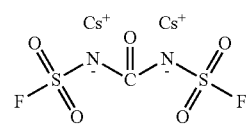

[Chemical Formula 1-1]

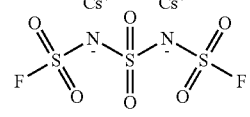

[Chemical Formula 1-2]

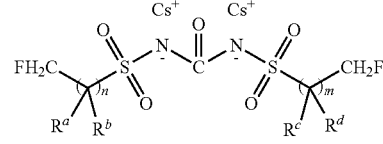

[Chemical Formula 1-3]

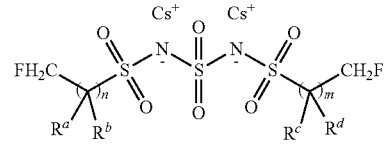

[Chemical Formula 1-4]

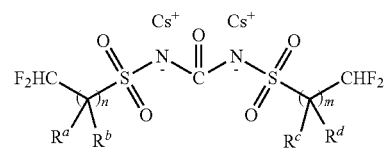

[Chemical Formula 1-5]

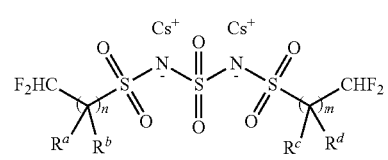

[Chemical Formula 1-6]

[Chemical Formula 1-7]

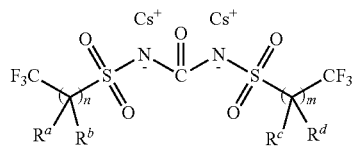

[Chemical Formula 1-8]

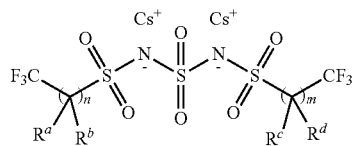

In Chemical Formula 1-1 or Chemical Formula 1-8, $R^a$, $R^b$, $R^c$, and $R^d$ are each independently hydrogen or a fluoro group, and n and m are each independently one of integers from 0 or 4.

As a specific example, the additive may be represented by Chemical Formula 1-1 or Chemical Formula 1-2.

Another embodiment of the present invention provides an electrolyte for a rechargeable lithium battery including a non-aqueous organic solvent, a lithium salt, and the aforementioned additive.

The additive may be included in an amount of 0.01 to 5.0 parts by weight based on 100 parts by weight of the electrolyte for a rechargeable lithium battery.

Another embodiment of the present invention provides a rechargeable lithium battery including a positive electrode including a positive electrode active material; a negative electrode including a negative electrode active material; and the aforementioned electrolyte.

The positive electrode active material may be a lithium composite oxide represented by Chemical Formula 4.

$$Li_xM^1_yM^2_zM^3_{1-y-z}O_{2-a}X_a \quad \text{[Chemical Formula 4]}$$

In Chemical Formula 4, $0.5 \leq x \leq 1.8$, $0 \leq a \leq 0.05$, $0 < y \leq 1$, $0 \leq z \leq 1$, $0 \leq y+z \leq 1$, $M^1$, $M^2$, and $M^3$ each independently include at least one element selected from a metal such as Ni, Co, Mn, Al, B, Ba, Ca, Ce, Cr, Fe, Mo, Nb, Si, Sr, Mg, Ti, V, W, Zr, or La, and a combination thereof, and X include at least one element selected from F, S, P, or Cl.

In Chemical Formula 4, $0.8 \leq y \leq 1$, $0 \leq z \leq 0.2$, and $M^1$ may be Ni.

The negative electrode active material may be graphite or may include a Si composite and graphite together.

The Si composite may include a core including Si-based particles and an amorphous carbon coating layer.

The Si-based particle may include one or more of a Si—C composite, $SiO_x$ ($0 < x \leq 2$), and a Si alloy.

The Si—C composite may include a core including Si particles and crystalline carbon and an amorphous carbon coating layer on the surface of the core, and an average particle diameter of the Si particles may be 50 nm to 200 nm.

Advantageous Effects

A rechargeable lithium battery having excellent output characteristics and high-rate charging characteristics may be implemented.

DESCRIPTION OF SYMBOLS

Figure 1:
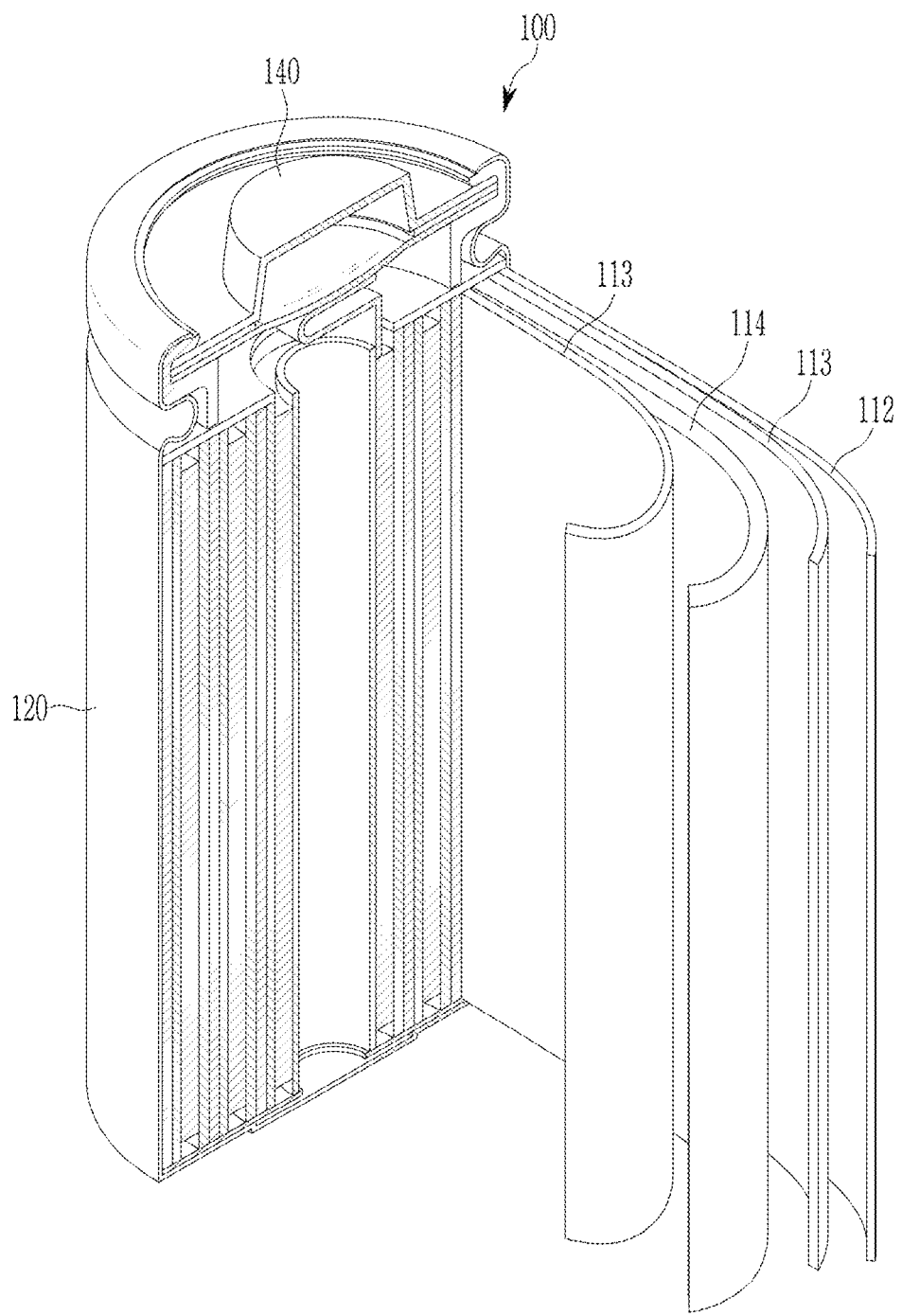
FIG. 1 is a schematic view showing a rechargeable lithium battery according to an embodiment of the present invention.

100: rechargeable lithium battery
112: negative electrode
113: separator
114: positive electrode
120: battery case
140: sealing member

MODE FOR INVENTION

Hereinafter, a rechargeable lithium battery according to an embodiment of the present invention will be described in detail with reference to the accompanying drawings. However, these embodiments are exemplary, the present invention is not limited thereto and the present invention is defined by the scope of claims.

A rechargeable lithium battery may be classified into a lithium ion battery, a lithium ion polymer battery, and a lithium polymer battery depending on kinds of a separator and an electrolyte. It also may be classified to be cylindrical, prismatic, coin-type, pouch-type, and the like depending on shape. In addition, it may be bulk type and thin film type depending on sizes. Structures and manufacturing methods for lithium ion batteries pertaining to this disclosure are well known in the art.

Herein, as an example of a rechargeable lithium battery, a cylindrical rechargeable lithium battery is for example described. FIG. 1 schematically illustrates the structure of a rechargeable lithium battery according to an embodiment. Referring to FIG. 1, a rechargeable lithium battery 100 according to an embodiment includes a battery cell including a positive electrode 114, a negative electrode 112 facing the positive electrode 114, a separator 113 between the positive electrode 114 and the negative electrode 112, and an electrolyte (not shown) impregnating the positive electrode 114, negative electrode 112, and separator 113, a battery case 120 housing the battery cell, and a sealing member 140 sealing the battery case 120.

Hereinafter, an additive according to an embodiment will be described. An additive according to an embodiment of the present invention may be represented by Chemical Formula 1.

[Chemical Formula 1]

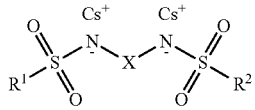

In Chemical Formula 1,

X is C(=O) or S(=O)$_2$, and

R$^1$ and R$^2$ are each independently a fluoro group, or a C1 to C5 fluoroalkyl group substituted with at least one fluoro group.

An additive according to an embodiment of the present invention has a structure including a cesium fluorosulfonylimide salt.

The additive is decomposed in the electrolyte and thus forms a film respectively on the surface of the positive electrode and the negative electrode. Specifically, the film on the positive electrode surface may effectively control elution of lithium ions from the positive electrode and thus prevent the decomposition of the positive electrode.

In addition, the additive is earlier reduced and decomposed than a carbonate-based solvent included in a non-aqueous organic solvent and forms an SEI (Solid Electrolyte Interface) on the negative electrode to prevent decomposition of the electrolyte and the resulting decomposition of the electrode, resultantly suppressing an increase in internal resistance due to gas generation. A portion of the SEI film formed on the negative electrode is decomposed through a reduction reaction during the charge and discharge, moves toward the positive electrode surface, and also forms a film on the positive electrode surface through an oxidation reaction to prevent the decomposition of the positive electrode surface and the oxidation reaction of the electrolyte, contributing to improving high and low temperature cycle-life characteristics.

For example, Chemical Formula 1 may be represented by one of Chemical Formulas 1-1 and 1-8.

[Chemical Formula 1-1]

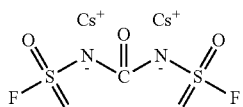

[Chemical Formula 1-2]

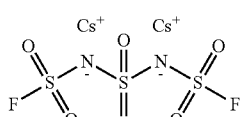

[Chemical Formula 1-3]

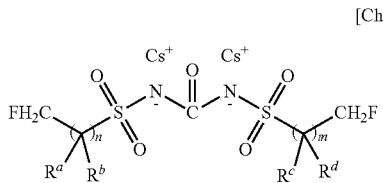

[Chemical Formula 1-4]

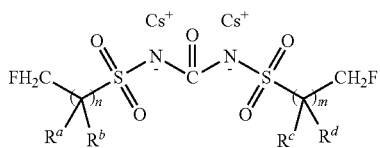

[Chemical Formula 1-5]

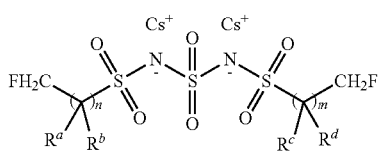

[Chemical Formula 1-6]

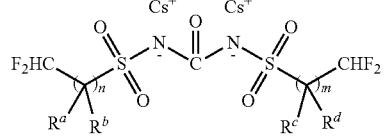

[Chemical Formula 1-7]

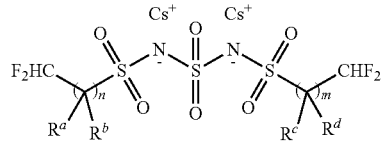

[Chemical Formula 1-8]

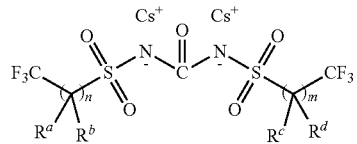

In Chemical Formula 1-1 or Chemical Formula 1-8,

R$^a$, R$^b$, R$^c$, and R$^d$ are each independently hydrogen or a fluoro group, and n and m are each independently one of integers from 0 or 4.

For example, the additive may be represented by Chemical Formula 1-1 or Chemical Formula 1-2.

An electrolyte for a rechargeable lithium battery according to another embodiment of the present invention includes a non-aqueous organic solvent, a lithium salt, and the aforementioned additive.

The additive may be included in an amount of 0.01 to 5.0 parts by weight, for example, 0.01 to 3.0 parts by weight, 0.01 to 2.0 parts by weight, 0.01 to 1.0 part by weight, 0.05 to 1.0 part by weight, 0.1 to 1.0 part by weight, or 0.2 to 1.0 part by weight, based on 100 parts by weight of the electrolyte for the rechargeable lithium battery.

When the content of the additive is within the ranges, a rechargeable lithium battery with cycle-life characteristics and low temperature output characteristics may be realized by preventing the resistance increase during the long-term charge/discharge or at a low temperature.

The non-aqueous organic solvent serves as a medium for transmitting ions taking part in the electrochemical reaction of a battery.

The non-aqueous organic solvent serves as a medium for transmitting ions taking part in the electrochemical reaction of a battery.

The carbonate-based solvent may be dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may be methyl acetate, ethyl acetate, n-propyl acetate, t-butyl acetate, methyl propionate, ethyl propionate, propyl propionate, decanolide, mevalonolactone, caprolactone, and the like. The ether-based solvent may be dibutyl ether, tetraglyme, diglyme, dimethoxyethane, 2-methyltetrahydrofuran, tetrahydrofuran, and the like. In addition, the ketone-based solvent may be cyclohexanone, and the like. The alcohol-based solvent may include ethanol, isopropyl alcohol, and the like, and the aprotic solvent may include nitriles such as R—CN (wherein R is a hydrocarbon group having a C2 to C20 linear, branched, or cyclic structure and may include a double bond, an aromatic ring, or an ether bond), and the like, amides such as dimethyl formamide, and the like, dioxolanes such as 1,3-dioxolane, and the like, sulfolanes, and the like.

The non-aqueous organic solvent may be used alone or in a mixture, and when used in a mixture, the mixing ratio may be appropriately adjusted in accordance with a desired battery performance, which is widely understood by those skilled in the art.

The carbonate-based solvent is prepared by mixing a cyclic carbonate and a chain carbonate. When the cyclic carbonate and chain carbonate are mixed together in a volume ratio of 1:1 to 1:9, a performance of the electrolyte may be improved.

The non-aqueous organic solvent may further include an aromatic hydrocarbon-based organic solvent in addition to the carbonate-based solvent.

Herein, the carbonate-based solvent and the aromatic hydrocarbon-based organic solvent may be mixed in a volume ratio of 1:1 to 30:1.

The aromatic hydrocarbon-based organic solvent may be an aromatic hydrocarbon-based compound of Chemical Formula 2.

[Chemical Formula 2]

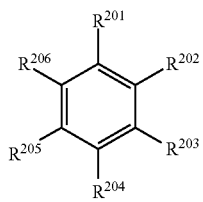

In Chemical Formula 2, $R^{201}$ to $R^{206}$ are the same or different and are hydrogen, a halogen, a C1 to C10 alkyl group, a haloalkyl group, or a combination thereof.

Specific examples of the aromatic hydrocarbon-based organic solvent may be benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, or a combination thereof.

The electrolyte may further include vinylene carbonate, vinyl ethylene carbonate, or an ethylene carbonate-based compound represented by Chemical Formula 3 as an additive to improve cycle-life of a battery.

[Chemical Formula 3]

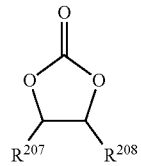

In Chemical Formula 3, $R^{207}$ and $R^{208}$ are the same or different, and are selected from hydrogen, a halogen, a cyano group (CN), a nitro group ($NO_2$), and a fluorinated C1 to C5 alkyl group, provided that at least one of $R^{207}$ and $R^{208}$ is selected from a halogen, a cyano group (CN), a nitro group ($NO_2$), and a fluorinated C1 to C5 alkyl group, and both $R^{207}$ and $R^{208}$ are not hydrogen.

Examples of the ethylene carbonate-based compound may include difluoroethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. When such an additive for improving cycle-life is further used, its amount may be appropriately adjusted.

The lithium salt dissolved in the non-organic solvent supplies lithium ions in a battery, enables a basic operation of a rechargeable lithium battery, and improves transportation of the lithium ions between positive and negative electrodes. Examples of the lithium salt may include at least one selected from $LiPF_6$, $LiBF_4$, LiDFOP, LiDFOB, $LiPO_2F_2$, $LiSbFe$, $LiAsF_6$, $LiN(SO_2C_2F_5)_2$, $Li(CF_3SO_2)_2N$, $LiN(SO_3C_2F_6)_2$, $Li(FSO_2)_2N$ (lithium bis(fluorosulfonyl) imide: LiFSI), $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are natural numbers, for example an integer of 1 to 20), LiCl, LiI, and $LiB(C_2O_4)_2$ (lithium bis(oxalato) borate: LiBOB). The lithium salt may be used in a concentration ranging from 0.1 M to 2.0 M. When the lithium salt is included at the above concentration range, an electrolyte may have excellent performance and lithium ion mobility due to optimal electrolyte conductivity and viscosity.

Another embodiment of the present invention provides a rechargeable lithium battery including a positive electrode including a positive electrode active material; a negative electrode including a negative electrode active material; and the aforementioned electrolyte.

The positive electrode includes a positive electrode current collector and a positive electrode active material layer on the positive electrode current collector, and the positive electrode active material layer includes a positive electrode active material.

The positive electrode active material may include lithiated intercalation compounds that reversibly intercalate and deintercalate lithium ions.

Specifically, at least one of composite oxides of a metal selected from cobalt, manganese, nickel, and a combination thereof and lithium may be used.

Of course, the composite oxide in which a portion of the metal is substituted with a metal other than another metal may be used, and a phosphate compound of the composite oxide, for example, at least one selected from $LiFePO_4$, $LiCoPO_4$, and $LiMnPO_4$ may be used. The lithium composite oxide may have a coating layer on the surface, or the lithium composite oxide may be mixed with another composite oxide having a coating layer. The coating layer may include at least one coating element compound selected from an oxide of a coating element, a hydroxide of a coating element, an oxyhydroxide of a coating element, an oxycarbonate of a coating element, and a hydroxy carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating process may include any conventional processes as long as it does not cause any side effects on the properties of the positive electrode active material (e.g., inkjet coating, dipping), which is well known to persons having ordinary skill in this art, and thus a detailed description thereof is omitted.

The positive electrode active material may be, for example, at least one of lithium composite oxides represented by Chemical Formula 4.

$$Li_xM^1{}_yM^2{}_zM^3{}_{1-y-z}O_{2-a}X_a$$ [Chemical Formula 4]

In Chemical Formula 4,
0.5≤x≤1.8, 0≤a≤0.05, 0<y≤1, 0≤z≤1, 0≤y+z≤1, $M^1$, $M^2$, and $M^3$ each independently include at least one element selected from a metal such as Ni, Co, Mn, Al, B, Ba, Ca, Ce, Cr, Fe, Mo, Nb, Si, Sr, Mg, Ti, V, W, Zr, or La, and a combination thereof, and X include at least one element selected from F, S, P, and Cl.

For example, in Chemical Formula 4, $M^1$ may be Ni, and $M^2$ and $M^3$ may each independently be one or more elements selected from metals such as Co, Mn, Al, B, Ba, Ca, Ce, Cr, Fe, Mo, Nb, Si, Sr, Mg, Ti, V, W, Zr, or La, and a combination thereof.

In Chemical Formula 4, 0.6≤x≤1.8, 0.3≤y≤1, and 0.01≤z≤0.7.

For example, in Chemical Formula 4, $M^1$ may be Ni, $M^2$ may be Co, and $M^3$ may be one or more elements selected from metals such as Mn, Al, B, Ba, Ca, Ce, Cr, Fe, Mo, Nb, Si, Sr, Mg, Ti, V, W, Zr, or La, and a combination thereof.

In Chemical Formula 4 0.7≤x≤1.8, 0.3≤y≤1, and 0≤z≤0.6; 0.8≤x≤1.8, 0.4≤y≤1, and 0≤z≤0.5, 0.9≤x≤1.8, 0.5≤y≤1, and 0≤z≤0.4, 0.6≤y≤1, and 0≤z≤0.3, or 0.7≤y≤1 and 0≤z≤0.2.

For example, in Chemical Formula 4, $M^1$ may be Ni, and in Chemical Formula 4, 0.8≤y≤1 and 0≤≤0.2

In an embodiment, the positive electrode active material may be at least one selected from $LiCoO_2$, $LiNiO_2$, $LiMnO_2$, $LiMn_2O_4$, $LiNi_aMn_bCo_cO_2$ (a+b+c=1), $LiNi_aMn_bCo_cAl_dO_2$ (a+b+c+d=1), and $LiNi_eCo_fAl_gO_2$ (e+f+g=1).

For example, the positive electrode active material selected from $LiNi_aMn_bCo_cO_2$ (a+b+c=1), $LiNi_aMn_bCo_cAl_dO_2$ (a+b+c+d=1), and $LiNi_eCo_fAl_gO_2$ (e+f+g=1) may be a high Ni-based positive electrode active material.

For example, in the case of $LiNi_aMn_bCo_cO_2$ (a+b+c=1) and $LiNi_aMn_bCo_cAl_dO_2$ (a+b+c+d=1), the nickel content may be greater than or equal to 60% (a≥0.6), and more specifically, greater than or equal to 80% (a≥0.8).

For example, in the case of $LiNi_eCo_fAl_gO_2$ (e+f+g=1), the nickel content may be greater than or equal to 60% (e≥0.6), and more specifically, greater than or equal to 80% (e≥0.8).

A content of the positive electrode active material may be 90 wt % to 98 wt % based on the total weight of the positive electrode active material layer.

In an embodiment of the present invention, the positive electrode active material layer may optionally include a conductive material and a binder. In this case, a content of the conductive material and the binder may be 1.0 wt % to 5.0 wt %, respectively, based on the total weight of the positive electrode active material layer.

The conductive material is included to impart conductivity to the positive electrode and any electrically conductive material may be used as a conductive material unless it causes a chemical change in the configured battery.

Examples of the conductive material may include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The binder improves binding properties of positive electrode active material particles with one another and with a current collector. Examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but is not limited thereto.

The positive electrode current collector may include Al, but is not limited thereto.

The negative electrode includes a negative electrode current collector and a negative electrode active material layer including a negative electrode active material formed on the negative electrode current collector.

The negative electrode active material may include a material that reversibly intercalates/deintercalates lithium ions, a lithium metal, a lithium metal alloy, a material capable of doping/dedoping lithium, or transition metal oxide.

The material that reversibly intercalates/deintercalates lithium ions includes a carbon material. The carbon material may be any generally-used carbon-based negative electrode active material in a rechargeable lithium battery and examples of the carbon material include crystalline carbon, amorphous carbon, and a combination thereof. The crystalline carbon may be non-shaped, or sheet, flake, spherical, or fiber-shaped natural graphite or artificial graphite and the amorphous carbon may be a soft carbon, a hard carbon, a mesophase pitch carbonization product, calcined coke, and the like.

The lithium metal alloy may include lithium and a metal selected from Na, K, Rb, Cs, Fr, Be, Mg, Ca, Sr, Si, Sb, Pb, In, Zn, Ba, Ra, Ge, Al, and Sn.

The material being capable of doping/dedoping lithium may be a Si-based compound, for example Si, a Si—C composite, $SiO_x$ (0<x<2), a Si-Q alloy (wherein Q is an element selected from an alkali metal, an alkaline-earth metal, a Group 13 element, a Group 14 element, a Group 15 element, a Group 16 element, a transition metal, a rare earth element, and a combination thereof, but not Si), Sn, $SnO_2$, Sn—R (wherein R is an element selected from an alkali metal, an alkaline-earth metal, a Group 13 element, a Group 14 element, a Group 15 element, a Group 16 element, a transition metal, a rare earth element, and a combination thereof, but not Sn), and the like. At least one of these materials may be mixed with $SiO_2$.

The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

The transition metal oxide may be a vanadium oxide, a lithium vanadium oxide, and the like.

In an embodiment, the negative electrode active material may be graphite or may include a Si composite and graphite together.

When the negative electrode active material includes the Si composite and graphite together, the Si composite and graphite may be included in the form of a mixture, and the Si composite and graphite may be included in a weight ratio of 1:99 to 50:50. More specifically, the Si composite and graphite may be included in a weight ratio of 3:97 to 20:80 or 5:95 to 20:80.

The Si composite may include a core including Si-based particles and an amorphous carbon coating layer. For example, the Si-based particles may include a Si—C composite, SiOx ($0<x\leq2$), a Si alloy or a mixture thereof. For example, the Si—C composite may include a core including Si particles and crystalline carbon, and an amorphous carbon coating layer on the surface of the core.

The crystalline carbon may include, for example, graphite, and more specifically, natural graphite, artificial graphite, or a mixture thereof.

An average particle diameter of the crystalline carbon may be 5 μm to 30 μm.

In the present specification, an average particle diameter may be a particle size (D50) at a volume ratio of 50% in a cumulative size-distribution curve.

In the Si—C composite, an average particle diameter of the Si particles may be 50 nm to 200 nm.

When the average particle diameter of the Si particles is within the above ranges, volume expansion occurring during charging and discharging may be suppressed, and interruption of a conductive path due to particle crushing during charging and discharging may be prevented.

The Si particles may be included in an amount of 1 wt % to 60 wt %, for example, 3 wt % to 60 wt %, based on the total weight of the Si—C composite.

The amorphous carbon precursor may be a coal-based pitch, mesophase pitch, petroleum-based pitch, coal-based oil, petroleum-based heavy oil, or a polymer resin such as a phenol resin, a furan resin, or a polyimide resin.

The amorphous carbon may be included in an amount of 1 to 50 parts by weight, for example, 5 to 50 parts by weight, or 10 to 50 parts by weight based on 100 parts by weight of the crystalline carbon.

In the negative electrode active material layer, the negative electrode active material may be included in an amount of 95 wt % to 99 wt % based on the total weight of the negative electrode active material layer.

In an embodiment, the negative electrode active material layer may include a binder, and optionally a conductive material. The content of the binder in the negative electrode active material layer may be 1 wt % to 5 wt % based on the total weight of the negative electrode active material layer. In addition, when the conductive material is further included, 90 wt % to 98 wt % of the negative electrode active material, 1 wt % to 5 wt % of the binder, and 1 wt % to 5 wt % of the conductive material may be used.

The binder improves binding properties of negative electrode active material particles with one another and with a current collector. The binder may be a non-water-soluble binder, a water-soluble binder, or a combination thereof.

The non-water-soluble binder may be polyvinylchloride, carboxylated polyvinylchloride, polyvinylfluoride, polyurethane, polytetrafluoroethylene, polyvinylidene fluoride, polyethylene, polypropylene, polyamideimide, polyimide, or a combination thereof.

The water-soluble binder may be a rubber-based binder or a polymer resin binder. The rubber-based binder may be selected from a styrene-butadiene rubber, an acrylated styrene-butadiene rubber (SBR), an acrylonitrile-butadiene rubber, an acrylic rubber, a butyl rubber, a fluorine rubber, and a combination thereof. The polymer resin binder may be selected from polytetrafluoroethylene, ethylenepropyleneco polymer, polyethylene oxide, polyvinylpyrrolidone, polyepichlorohydrine, polyphosphazene, polyacrylonitrile, polystyrene, an ethylene propylene diene copolymer, polyvinylpyridine, chlorosulfonated polyethylene, latex, a polyester resin, an acrylic resin, a phenolic resin, an epoxy resin, polyvinyl alcohol, or a combination thereof.

When the water-soluble binder is used as a negative electrode binder, a cellulose-based compound may be further used to provide viscosity as a thickener. The cellulose-based compound includes one or more of carboxymethyl cellulose, hydroxypropylmethyl cellulose, methyl cellulose, or alkali metal salts thereof. The alkali metals may be Na, K, or Li. Such a thickener may be included in an amount of 0.1 parts by weight to 3 parts by weight based on 100 parts by weight of the negative electrode active material.

The conductive material is included to improve electrode conductivity and any electrically conductive material may be used as a conductive material unless it causes a chemical change. Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The negative electrode current collector may be selected from a copper foil, a nickel foil, a stainless-steel foil, a titanium foil, a nickel foam, a copper foam, a polymer substrate coated with a conductive metal, and a combination thereof.

The rechargeable lithium battery may further include a separator between the negative electrode and the positive electrode, depending on a type of the battery. Such a separator may be a porous substrate or a composite porous substrate.

The porous substrate may be a substrate including pores, and lithium ions may move through the pores. The porous substrate may for example include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

The composite porous substrate may have a form including a porous substrate and a functional layer on the porous substrate. The functional layer may be, for example, at least one of a heat-resistant layer and an adhesive layer from the viewpoint of enabling additional function. For example, the heat-resistant layer may include a heat-resistant resin and optionally a filler.

In addition, the adhesive layer may include an adhesive resin and optionally a filler.

The filler may be an organic filler or an inorganic filler.

Referring to FIG. 1, a rechargeable lithium battery 100 according to an embodiment includes a battery cell including a negative electrode 112, a positive electrode 114 facing the negative electrode 112, a separator 113 interposed between the negative electrode 112 and the positive electrode 114, and an electrolyte (not shown) for a rechargeable lithium battery impregnating the negative electrode 112, the positive electrode 114, and the separator 113, a battery case 120 housing the battery cell, and a sealing member 140 sealing the battery case 120.

DETAILED DESCRIPTION OF THE EMBODIMENTS

Hereinafter, examples of the present invention and comparative examples are described. These examples, however, are not in any sense to be interpreted as limiting the scope of the invention.

SYNTHESIS OF ADDITIVES

Synthesis Example 1: Synthesis of Compound Represented by Chemical Formula 1-1

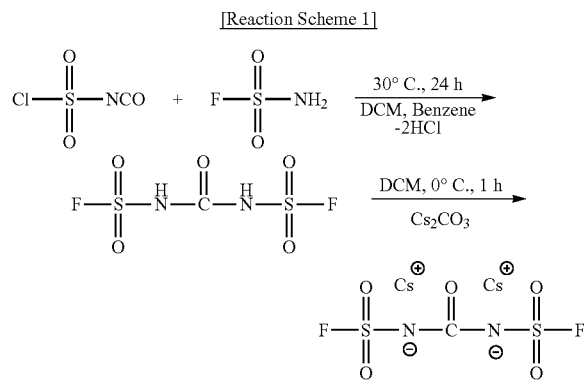

ClSO$_2$NCO (4.5 g, 0.03 mol) was added to 7.5 ml of benzene at 0° C. After dissolving sulfamoyl fluoride (3 g, 0.036 mol) in 15 ml of dichloromethane at 30° C. and then, adding the solution to the above solution, the solution mixture was stirred for 24 hours. Subsequently, nonreaction materials were removed therefrom through an evaporator. Herein, an intermediate product produced therein was confirmed through 1H-NMR, and the results are shown in FIG. 2.

Figure 2:
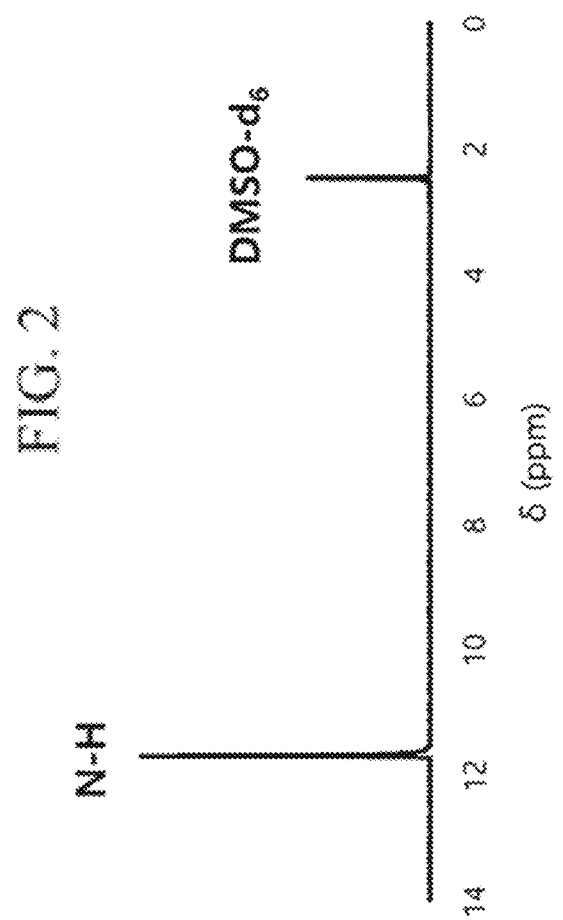
FIG. 2 is a 1H-NMR graph of an intermediate product produced during the synthesis of an additive represented by Chemical Formula 1-1.

FIG. 2 is a 1H-NMR graph of an intermediate product produced during the synthesis of an additive represented by Chemical Formula 1-1.

Referring to FIG. 2, the intermediate product of CO$_5$S$_2$F$_2$N$_2$H$_2$ had the following 1H-NMR peak data.

1H NMR (400 MHz, DMSO-d6): δ 11.68 (s, 2H)

Subsequently, a solution prepared by dissolving 2.5 M Cs$_2$CO$_3$ (2.5 eq.) in an n-hexane solution was added thereto at 0° C. and then, stirred for 1 hour. A semi-solid product obtained therefrom was passed through silica gel with a small amount of ethyl acetate as an eluent and then, concentrated to obtain an additive represented by Chemical Formula 1-1 as a white solid (a yield of CO$_5$S$_2$F$_2$N$_2$Cs$_2$: 54%).

Figure 3:
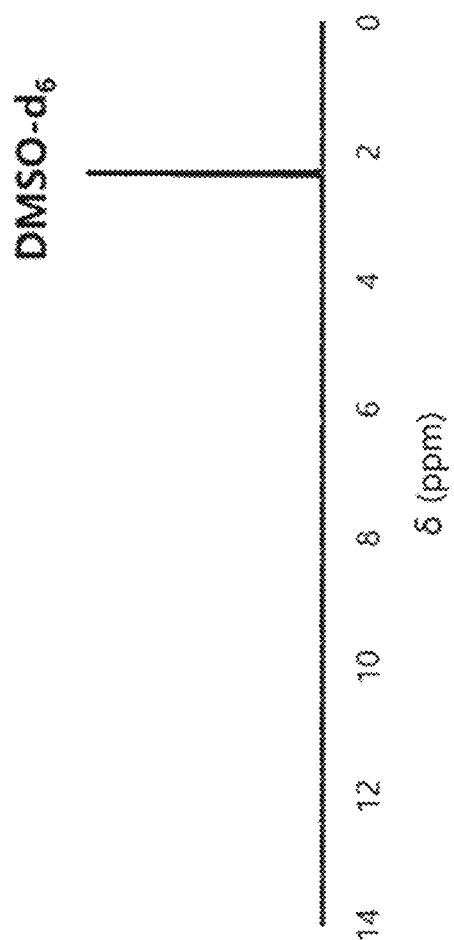
FIG. 3 is a 1H-NMR graph of an additive represented by Chemical Formula 1-1.

A synthesis result of the additive represented by Chemical Formula 1-1 was checked through 1H-NMR, and the result is shown in FIG. 3.

FIG. 3 is a 1H-NMR graph of an additive represented by Chemical Formula 1-1.

Referring to FIG. 3, which shows the result that the peak appearing in the 1H-NMR graph of the intermediate product of CO$_5$S$_2$F$_2$N$_2$H$_2$ disappeared, a target compound turned out to be produced.

1H NMR (400 MHz, DMSO-d6): δ–(s, H)

Synthesis Example 2: Synthesis of Compound Represented by Chemical Formula 1-2

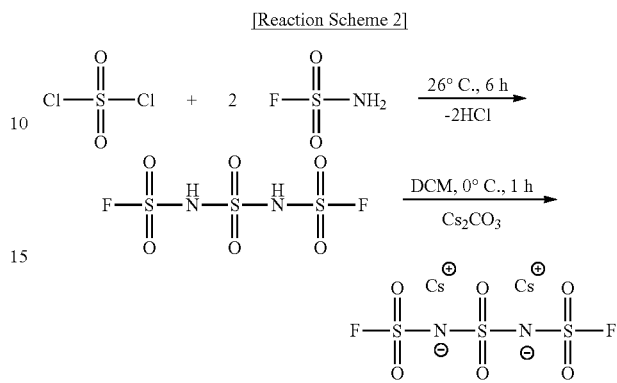

Sulfuryl dichloride (2.72 g, 0.02 mol) was added to FSO$_2$NH$_2$ (5 g, 0.05 mol) at 0° C. Subsequently, the obtained mixture was stirred at 25° C. for 6 hours, and non-reaction materials were removed therefrom through an evaporator. Herein, an intermediate product produced therein was confirmed through 1H-NMR, and the result is shown in FIG. 4.

Figure 4:
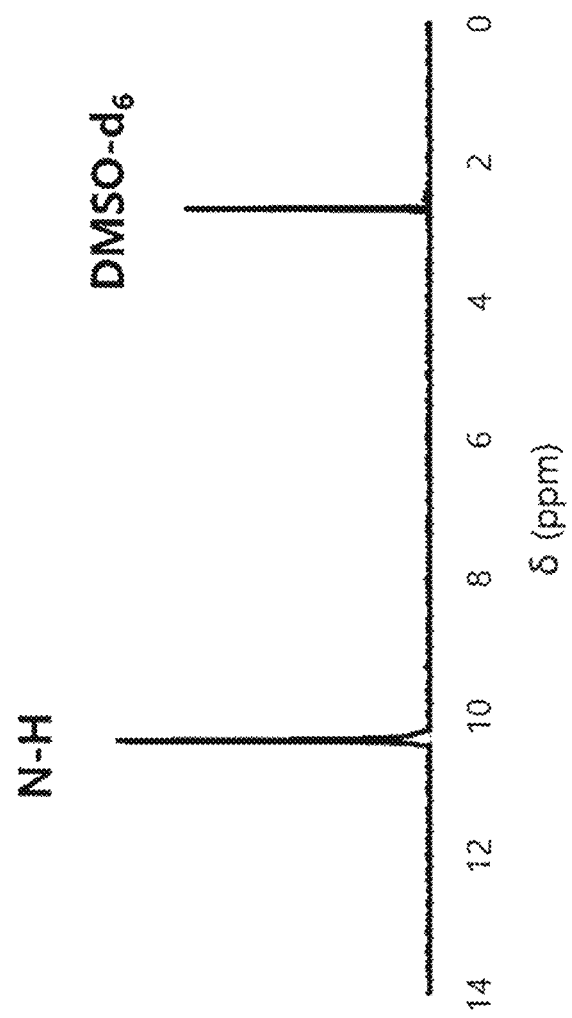
FIG. 4 is a 1H-NMR graph of an intermediate product produced during the synthesis of an additive represented by Chemical Formula 1-2.

FIG. 4 is a 1H-NMR graph of an intermediate product produced during the synthesis of an additive represented by Chemical Formula 1-2.

Referring to FIG. 4, 1H-NMR peak data of the intermediate product of O$_6$S$_3$F$_2$N$_2$H$_2$ are as follows.

1H NMR (400 MHz, DMSO-d6): δ 10.34 (s, 2H)

Subsequently, the obtained intermediate product was dissolved in 15 ml of dichloromethane, and a solution prepared by dissolving 2.5 M Cs$_2$CO$_3$ (2.5 eq.) in an n-hexane solution was added thereto and then, stirred at 0° C. for 1 hour. The obtained semi-solid product was passed through silica gel by using a small amount of ethyl acetate as an eluent and then, concentrated, obtaining an additive represented by Chemical Formula 1-2 as a white solid (a yield of O$_6$S$_3$F$_2$N$_2$Cs$_2$: 60%).

Figure 5:
FIG. 5 is a 1H-NMR graph of an additive represented by Chemical Formula 1-2.

A synthesis result of the additive represented by Chemical Formula 1-2 was confirmed through 1H-NMR, and the result is shown in FIG. 5.

FIG. 5 is a 1H-NMR graph of an additive represented by Chemical Formula 1-2.

Referring to FIG. 5, which shows the result that the peak appearing in the 1H-NMR graph of the intermediate product of O$_6$S$_3$F$_2$N$_2$Cs$_2$ disappeared, a target compound turned out to be produced.

1H NMR (400 MHz, DMSO-d6): δ–(s, H)

MANUFACTURE OF RECHARGEABLE LITHIUM BATTERY CELLS

Example 1

LiNi$_{0.88}$Co$_{0.07}$Al$_{0.05}$O$_2$ as a positive electrode active material, polyvinylidene fluoride as a binder, and ketjen black as a conductive material were mixed in a weight ratio of 97:2:1 and then, dispersed in N-methyl pyrrolidone, preparing positive electrode active material slurry.

The positive electrode active material slurry was coated on a 14 μm-thick Al foil, dried at 110° C., and pressed, manufacturing a positive electrode.

Negative electrode active material slurry was prepared by preparing a mixture of artificial graphite and an Si—C composite in a weight ratio of 93:7 as a negative electrode active material, mixing the negative electrode active material with a styrene-butadiene rubber binder and carboxylmethyl cellulose in a weight ratio of 97:1:2, and dispersing the mixture in distilled water.

The Si—C composite had a core including artificial graphite and silicon particles and also, coal-based pitch coated on the surface of the core.

The negative electrode active material slurry was coated on a 10 μm-thick Cu and then, dried at 100° C. and roll-pressed, manufacturing a negative electrode.

The positive electrode and the negative electrode were assembled with a 25 μm-thick polyethylene separator to manufacture an electrode assembly, and an electrolyte was injected thereinto, manufacturing a rechargeable lithium battery cell.

The electrolyte had a composition as follows.
(Composition of Electrolyte)
Salt: 1.5 M LiPF$_6$
Solvent: ethylene carbonate: ethylmethyl carbonate: dimethyl carbonate (EC:EMC:DMC=a volume ratio of 20:10:70)
Additive: 0.25 parts by weight of the compound represented by Chemical Formula 1-2 according to Synthesis Example 1
(However, in the composition of the electrolyte, "parts by weight" means a relative weight of additives based on 100 weight of the total electrolyte (lithium salt+non-aqueous organic solvent+additive))

Example 2

A rechargeable lithium battery was manufactured in the same manner as in Example 1, except that 0.5 parts by weight of the compound represented by Chemical Formula 1-2 was added as an additive.

Example 3

A rechargeable lithium battery was manufactured in the same manner as in Example 1, except that 1.0 part by weight of the compound represented by Chemical Formula 1-2 was added as an additive.

Example 4

A rechargeable lithium battery was manufactured in the same manner as in Example 1, except that 0.5 parts by weight of the compound represented by Chemical Formula 1-1 was added as an additive.

Comparative Example 1

A rechargeable lithium battery was manufactured in the same manner as in Example 1, except for using an electrolyte without additives.

Comparative Example 2

A rechargeable lithium battery was manufactured in the same manner as in Example 1, except that 0.5 parts by weight of cesium bis(fluorosulfonyl)imide represented by Chemical Formula A was used as an additive.

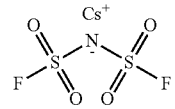

[Chemical Formula A]

Evaluation: Evaluation of Low-Temperature (10° C.) Cycle-Life Characteristics

The lithium battery cells according to Examples 1 to 4 and Comparative Examples 1 and 2 were evaluated with respect to cycle-life characteristics as follows, and the results are shown in Table 1 and FIG. 6.

The charge and discharge experiments were conducted at 10° C., wherein initial formation efficiency was evaluated at the 0.1 C charge/0.1 C discharge, and a cycle-life was evaluated by 100 times repeating the 1.5 C charge/1.0 C discharge. The cycle-life characteristics was evaluated by calculating capacity retention defined by Equation 1.

Capacity retention rate [%]=[Discharge capacity in each cycle/Discharge capacity in the 1st cycle]*100     <Equation 1>

Figure 6:
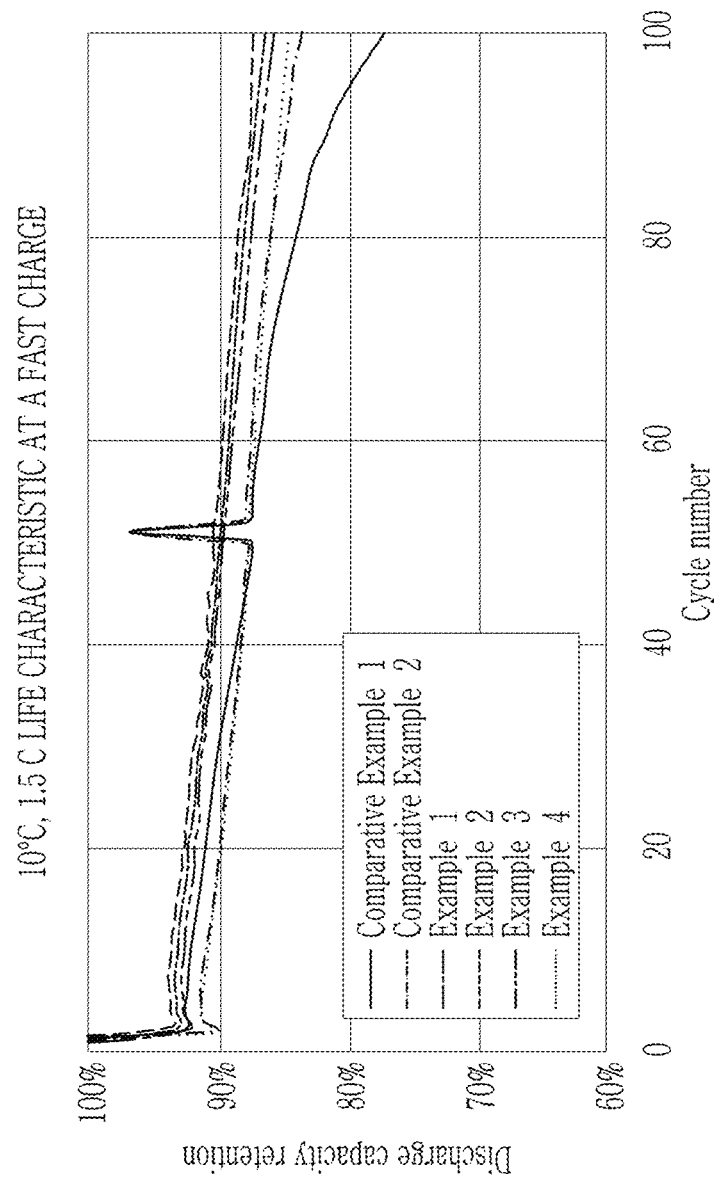
FIG. 6 is a graph showing discharge capacity retention rates of the rechargeable lithium battery cells according to Examples 1 to 4 and Comparative Examples 1 and 2 at a low temperature (10° C.).

While 100 cycles charged and discharged within 2.5 V to 4.2 V at 1.5 C charge/1.0 C discharge C-rate at 10° C., the cells were measured with respect to a change in discharge capacity, and the results are shown in FIG. 6, and particularly, discharge capacity retentions at the 100$^{th}$ cycle are shown in Table 1.

TABLE 1

| | Additive composition (parts by weight) | Low-temperature (10° C.) discharge capacity retention rate (%) |
| --- | --- | --- |
| Comparative Example 1 | — | 77.1 |
| Comparative Example 2 | Chemical Formula A (0.5) | 83.4 |
| Example 1 | Chemical Formula 1-2 (0.25) | 86.2 |
| Example 2 | Chemical Formula 1-2 (0.5) | 87.0 |
| Example 3 | Chemical Formula 1-2 (1.0) | 85.5 |
| Example 4 | Chemical Formula 1-1 (0.5) | 84.4 |

FIG. 6 is a graph showing discharge capacity retention rates of the rechargeable lithium battery cells according to Examples 1 to 4 and Comparative Examples 1 and 2 at a low temperature (10° C.).

Referring to Table 1 and FIG. 6, Examples 1 to 4, compared with Comparative Examples 1 and 2, exhibited improved low temperature cycle-life characteristics.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

The invention claimed is:

1. An additive represented by Chemical Formula 1:

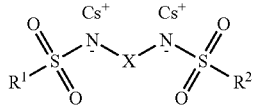

[Chemical Formula 1]

wherein in Chemical Formula 1,
X is C(=O) or S(=O)$_2$, and
$R^1$ and $R^2$ are each independently a fluoro group, or a C1 to C5 fluoroalkyl group substituted with at least one fluoro group.

2. The additive of claim 1, wherein
Chemical Formula 1 is represented by one of Chemical Formula 1-1 to Chemical Formula 1-8:

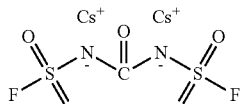

[Chemical Formula 1-1]

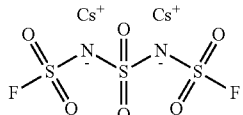

[Chemical Formula 1-2]

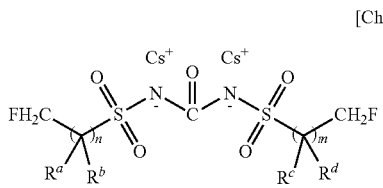

[Chemical Formula 1-3]

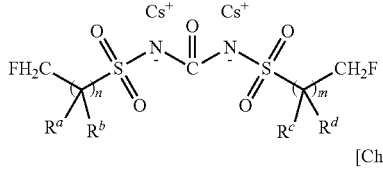

[Chemical Formula 1-4]

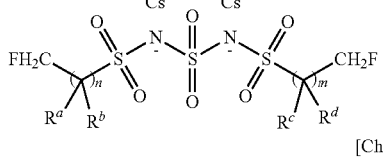

[Chemical Formula 1-5]

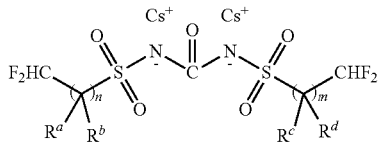

[Chemical Formula 1-6]

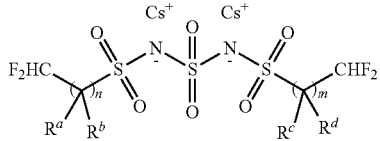

[Chemical Formula 1-7]

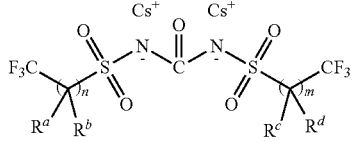

[Chemical Formula 1-8]

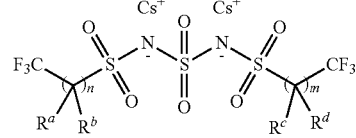

wherein, in Chemical Formula 1-1 to Chemical Formula 1-8,
$R^a$, $R^b$, $R^c$, and $R^d$ are each independently hydrogen or a fluoro group, and
n and m are each independently one of integers from 0 or 4.

3. The additive of claim 1, wherein
the additive is represented by Chemical Formula 1-1 or Chemical Formula 1-2.

4. An electrolyte for a rechargeable lithium battery, comprising
a non-aqueous organic solvent,
a lithium salt, and
the additive of any one of claim 1 to claim 3.

5. The electrolyte of claim 4, wherein
the additive is included in an amount of 0.01 to 5.0 parts by weight based on 100 parts by weight of the electrolyte.

6. A rechargeable lithium battery comprising
a positive electrode including a positive electrode active material;
a negative electrode including a negative electrode active material; and
the electrolyte of claim 5.

7. The rechargeable lithium battery of claim 6, wherein
the positive electrode active material is represented by Chemical Formula 4:

$$Li_xM^1_yM^2_zM^3_{1-y-z}O_{2-a}X_a$$ [Chemical Formula 4]

wherein, in Chemical Formula 4,
0.5≤x≤1.8, 0≤a≤0.05, 0<y≤1, 0≤z≤1, 0≤y+z≤1, $M^1$, $M^2$, and $M^3$ each independently include at least one element selected from a metal of Ni, Co, Mn, Al, B, Ba, Ca, Ce, Cr, Fe, Mo, Nb, Si, Sr, Mg, Ti, V, W, Zr, La, and a combination thereof, and X includes at least one element selected from F, S, P, and Cl.

8. The rechargeable lithium battery of claim 7, wherein
in Chemical Formula 4,
0.8≤y≤1, 0≤z≤0.2, and $M^1$ is Ni.

9. The rechargeable lithium battery of claim 6, wherein
the negative electrode active material is graphite or includes a Si composite and graphite together.

10. The rechargeable lithium battery of claim 9, wherein
the Si composite include a core including Si-based particles and an amorphous carbon coating layer.

11. The rechargeable lithium battery of claim 10, wherein
the Si-based particles include one or more of a Si—C composite, SiO$_x$ (0<x≤2), and a Si alloy.

12. The rechargeable lithium battery of claim 11, wherein
the Si—C composite includes a core including Si particles and crystalline carbon and an amorphous carbon coating layer on a surface of the core, and
an average particle diameter of the Si particles is 50 nm to 200 nm.

* * * * *